US012629699B2

(12) United States Patent　　(10) Patent No.:　US 12,629,699 B2
Schulz et al.　　(45) Date of Patent:　May 19, 2026

(54) SEPARATOR INSERT, SEPARATOR AND METHOD FOR EXCHANGING A SEPARATOR INSERT

(71) Applicant: GEA WESTFALIA SEPARATOR GROUP GMBH, Oelde (DE)

(72) Inventors: Andreas Schulz, Beckum (DE); Kai Helmrich, Drensteinfurt (DE); Kathrin Quiter, Drensteinfurt (DE); Rüdiger Göhmann, Oelde (DE); Jürg Burkart, Rudolfstetten (CH); Simon Stöckli, Rehetobel (CH)

(73) Assignee: GEA WESTFALIA SEPARATOR GROUP GmbH, Oelde (DE)

( * ) Notice: Subject to any disclaimer, the term of this patent is extended or adjusted under 35 U.S.C. 154(b) by 556 days.

(21) Appl. No.: 18/021,068

(22) PCT Filed: Aug. 5, 2021

(86) PCT No.: PCT/EP2021/071879
§ 371 (c)(1),
(2) Date: Feb. 13, 2023

(87) PCT Pub. No.: WO2022/033954
PCT Pub. Date: Feb. 17, 2022

(65) Prior Publication Data
US 2023/0321670 A1　　Oct. 12, 2023

(30) Foreign Application Priority Data

Aug. 14, 2020　(DE) ..................... 10 2020 121 419.7

(51) Int. Cl.
B04B 1/08　　(2006.01)
B01D 21/26　　(2006.01)
(Continued)

(52) U.S. Cl.
CPC .............. B04B 1/08 (2013.01); B01D 21/262 (2013.01); B04B 7/14 (2013.01); B04B 9/12 (2013.01); B04B 11/02 (2013.01)

(58) Field of Classification Search
CPC .... B04B 1/08; B04B 7/14; B04B 9/12; B04B 11/02; B04B 7/02; B04B 7/08;
(Continued)

(56) References Cited

U.S. PATENT DOCUMENTS 2,688,405 A * 9/1954 Sharples ................... B04B 3/00
　　　　　　　　　　　　　　　　210/330
4,950,401 A * 8/1990 Unger ................... B04B 5/0442
　　　　　　　　　　　　　　　　494/56
(Continued)

FOREIGN PATENT DOCUMENTS

DE　　　69521504 T2　10/2001
DE　202008011597 U1 * 1/2010 ........... B04B 11/082
(Continued)

OTHER PUBLICATIONS

Office Action dated Apr. 1, 2025 in related/corresponding JP Application No. 2023-510475.
(Continued)

*Primary Examiner* — Claire X Wang
*Assistant Examiner* — Shuyi S. Liu
(74) *Attorney, Agent, or Firm* — PATENT PORTFOLIO BUILDERS PLLC

(57) ABSTRACT

A separator includes a frame and a separator insert exchangeably disposed on the frame. The separator insert is designed to separate a flowable suspension into at least two flowable phases of different density in a centrifugal field and forms a pre-assembled, exchangeable unit for inserting into stator units on the frame of the separator. Mutually spaced holders having stator units of the bearing devices are formed
(Continued)

Figure 1:
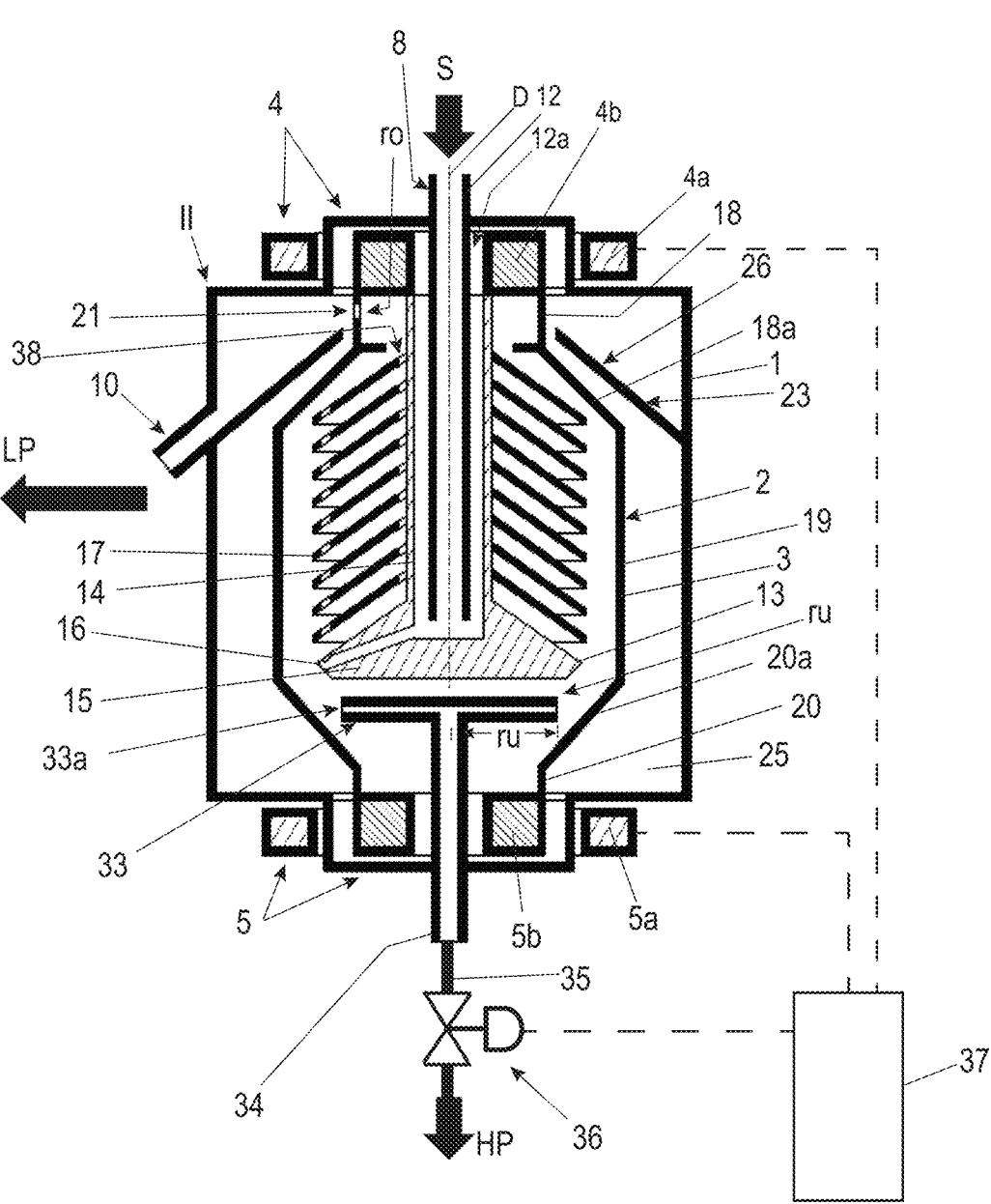

on the frame, between which holders the housing of the separator insert is non-rotatably retained such that the rotor with the drum remains rotatable. The relative position of the holders can be changed such that the separator insert can be exchanged. The housing and the holders have corresponding interlocking elements in order to non-rotatably retain the housing at the holders.

13 Claims, 8 Drawing Sheets

(51) Int. Cl.
 *B04B 7/14* (2006.01)
 *B04B 9/12* (2006.01)
 *B04B 11/02* (2006.01)
(58) Field of Classification Search
 CPC ......... B04B 9/04; B04B 5/0442; B04B 5/005;
  B04B 11/05; B04B 1/06; B04B 1/10;
  B04B 9/02; B04B 1/14; B04B 2001/2083;
  B04B 11/04; B04B 11/06; B04B 1/12;
  B04B 11/00; B01D 21/262; B01D
  17/0217; B01D 2221/10; B01D 45/12;
  A61M 1/3693; A61M 1/3696; G01N
  2035/00495; F01M 2001/1035; F01M
  2013/0422; B03C 2201/28; B03C
  2201/26; B03C 5/02; B03C 3/15; C12M
  33/10; C12M 47/02
 See application file for complete search history.

(56) References Cited

U.S. PATENT DOCUMENTS

| | | |
|---|---|---|
| 5,779,619 A | 7/1998 | Borgstrom et al. |
| 2005/0176571 A1 | 8/2005 | Merino et al. |
| 2015/0202635 A1 | 7/2015 | Spiegel et al. |
| 2016/0184836 A1 | 6/2016 | Mackel et al. |
| 2021/0031215 A1 | 2/2021 | Göhmann |

FOREIGN PATENT DOCUMENTS

| | | | | |
|---|---|---|---|---|
| DE | 102015103665 A1 | 9/2016 | | |
| DE | 102017128027 A1 * | 5/2019 | .............. | B04B 9/04 |
| EP | 2273124 B1 | 2/2015 | | |
| EP | 3666388 A1 | 6/2020 | | |
| EP | 3666394 A1 | 6/2020 | | |
| JP | 2015521542 A | 7/2015 | | |
| WO | 2014000829 A1 | 1/2014 | | |

OTHER PUBLICATIONS

International Search Report and Written Opinion mailed Nov. 26, 2021 in related/corresponding International Application No. PCT/EP2021/071879.
Search Report created May 7, 2021 in related/corresponding DE Application No. 10 2020 121 419.7.

\* cited by examiner

SEPARATOR INSERT, SEPARATOR AND METHOD FOR EXCHANGING A SEPARATOR INSERT

BACKGROUND AND SUMMARY OF THE INVENTION

Exemplary embodiments of the invention relate to a separator insert for a separator, a separator having such a separator insert, and a method for changing a separator insert.

Separators as defined in this document are used to separate a flowable suspension as a starting product in the centrifugal field into phases of different density. Steam sterilization of the separators used is necessary for a wide variety of applications. A relatively "small" steam-sterilizable separator with disk pack introduced to the market via the applicant is the separator "CSC 6" with a clarifying area equivalent to 6000 m². However, in some situations, such as in the laboratory, this machine is still relatively large. The known separators with disk stack available on the market are driven by means of a spindle, which in turn is directly driven by a motor or via a transmission. In addition, the known machines are made of stainless steel. For these reasons, filters are currently used very frequently in laboratories instead of centrifugal separators. In the case of a separator with a disk pack and with disposable plastic components (single-use technology-single use of pre-qualified plastic parts), steam sterilization (SIP-Sterilization In Place) would not be necessary. It could be particularly suitable for use in biotechnology.

WO 2014/000829 A1 discloses a separator for separating a flowable product into different phases, which has a rotatable drum with a drum lower part and a drum upper part and a means arranged in the drum for processing a suspension in the centrifugal field of solids or for separating a heavy solid-like phase from a lighter phase in the centrifugal field. One, several or all of the following elements consist of plastic or a plastic composite material: the drum lower part, the drum upper part, the means for clarifying. In this way it is possible to design a part of the drum or preferably even the entire drum-preferably together with the feed and discharge systems or areas—for single use, which is of particular interest and advantage with regard to the processing of pharmaceutical products such as fermentation broths or the like, since after operation for the processing of a corresponding product batch in preferably continuous operation during the processing of the product batch, no cleaning of the product-contacting parts of the drum has to be carried out, but the drum as a whole can be replaced. Especially from a hygienic point of view, this separator is thus very advantageous. In order to achieve a physical separation between this disposable drum and the drive, a contact-free coupling between the drive and the drum is advantageous.

A further development is shown in DE 10 2017 128 027, in which the bearing devices are designed as magnetic bearings and one of the magnetic bearing devices is preferably also used as a drive device for rotating the drum, which is held in suspension during operation. This eliminates the need for mechanical components for rotating and supporting the drum, which favors the design as a separator with a separator insert for single use, since replacement of this separator insert is very easy to handle. These advantages are also exploited by the present invention.

Against this background, exemplary embodiments of the invention are directed to a generic separator insert—which can be used or designed as a disposable element—in such a way that the separation process can be controlled more easily.

According to the invention a separator has a frame and a separator insert exchangeably arranged on the frame, wherein the separator insert is designed for separating a flowable suspension in a centrifugal field into at least two flowable phases of different density and for forming a pre-assembled, exchangeable unit for insertion into stator units on the frame of the separator and having at least the following: a housing that is stationary in operation and is designed in the manner of a container that is closed except for a plurality of openings, a rotor arranged within the housing and rotatable about an axis of rotation and having a drum having one or more openings, preferably a separating means arranged in the drum, at least two rotor units for magnetic bearing devices at two axially spaced locations of the rotor with the drum, by means of which the rotor with the drum can be held in suspension, is rotatably supportable and can be made to rotate within the housing in operation, wherein, furthermore, mutually spaced holders having stators units of the bearing devices are formed on the frame, between which holders the housing of the separator insert is non-rotatably retained so that the rotor remains rotatable, wherein the relative position of the holders having the stator units of the bearing devices can be changed such that the separator insert can be exchanged, and wherein the housing and the holders have corresponding interlocking elements in order to non-rotatably retain the housing on the holders.

"In operation" means during centrifugal processing when the rotor is turning.

According to the invention, it is possible to provide a separator comprising a disposable module with disposable "drum" and "housing" components, whereas at least the frame and parts of the bearing and drive device can be reusable. By changing the position, the corresponding interlocking elements can be engaged and disengaged to change the separator insert. The invention enables the manufacture of a separator in which a disposable separator insert can be used, which is preferably designed such that all components in contact with the product are made of plastic or other non-magnetic materials which can be disposed of after single use. Cleaning after use is thus not necessary. The machine and its operation can thus be made significantly less expensive. Magnets can be optionally recycled.

It is simple and safe in this case to provide mutually spaced holders for the bearing devices on the frame, between which the separator insert can be non-rotatably inserted.

It can further be provided that the separator insert can be attached to the frame in a form-fit and force-fit manner so that it cannot rotate.

According to a particularly simple variant, the holders and the housing can have corresponding pins and recesses as corresponding interlocking elements for holding the housing on the holders in a rotationally fixed manner. It is particularly simple if the holders and pins each extend axially.

It can also be provided that the position of the holders, in particular on the console, can be adjusted in order to be able to change the separator insert. For this purpose, the relative spacing of the holders can be adjustable, but one or both holders can also be designed to be foldable, pivotable, rotatable, or displaceable in order to be able to place the separator insert between the holders. Preferably, according to one variant, the relative vertical position can be changed by adjusting the vertical relative distance of the holders with the stator units of the bearing devices in such a way that the separator insert can be exchanged, so that the corresponding interlocking elements can be brought into and out of engagement by the adjustment.

In this way, the separator insert can be changed quickly and easily after each batch has been processed.

According to a particularly simple first variant, only one of the two holders can be arranged adjustably, in particular height-adjustably, on the frame, in particular on the console, and the other holder can be arranged in a stationary manner on the frame, in particular on the console. Alternatively, it is possible for both holders to be arranged adjustably, in particular height-adjustably, on the frame, in particular on the console.

It is further advantageous and simple, in particular from a design point of view, if one or both holders is/are displaceably arranged on the frame, in particular on the console.

It is further advantageous if, when the separator insert is inserted into one or both of the holders, one or more axially outgoing hoses on the separator insert are guided through a respective passage opening of the respective holder.

It is preferred, because it is simple and practical, that the rotor units are located at both axial ends of the drum, and that two corresponding stator units are formed on the frame of the separator. In this way, magnetic bearing devices are formed at both axial ends of the drum.

Here it is particularly advantageous that, according to the invention, the functionally required position of the stator units and the rotor units relative to each other is well ensured mechanically. This applies in particular to the precise axial and radial centering of the stator and rotor units, which lie coaxially one inside the other.

The invention also provides a separator insert for separating a flowable suspension in a centrifugal field into at least two flowable phases of different density, which forms a pre-assembled, exchangeable unit for insertion into stator units on the frame of the separator and comprises at least the following: a housing that is stationary in operation, designed in the manner of a container, designed to be closed except for one or more openings, a rotor arranged inside the housing and rotatable about an axis of rotation, with a drum which has one or more openings, a separating means arranged in the drum, at least two rotor units for magnetic bearing devices at two axially spaced locations of the drum, by means of which the rotor with the drum can be held in suspension, is rotatably supportable and can be made to rotate within the housing during operation, wherein the housing has interlocking elements for non-rotatably retaining the housing on an abutment. This separator insert is particularly suitable for a separator as an exchangeable module, wherein the frame, in particular its holders, form the abutment(s).

The invention also provides an advantageous and simple method for exchanging a first separator insert of a separator for a second separator insert, comprising the following steps:

a) Providing the separator with a first separator insert mounted to the frame, b) adjusting the relative position, in particular the relative distance, of the holders and releasing the interlock between the frame and the separator insert and removing the first separator insert from the holders;

c) providing the second separator insert (before, at or after steps a) and b));

d) inserting the other second separator insert into the one of the holders so that the corresponding interlocking elements at one end of the housing and at one of the holders engage into each other; and e) adjusting the relative position, in particular the relative distance, of the holders until the corresponding interlocking elements at both ends of the housing of the separator insert and non-rotatably engage into each other at the two holders.

According to an advantageous variant, at least one of the two magnetic bearing devices preferably also represents the rotary drive for the drum, wherein this drive is also suitable for driving the drum with freely adjustable speeds or freely selectable direction of rotation. It can be preferably provided that one or both magnetic bearing devices can act as radial and axial bearings and keep the rotor in suspension in the container at a distance from it during operation.

In interaction, the rotor and stator units form magnetic bearing devices. With these, the drum can be supported axially and radially and held in suspension.

According to a further advantageous and constructively particularly easy to implement variant, it is additionally provided that a further opening of the drum is designed as a free radial outlet for a second of the flowable phases from the drum into the housing, from which it can be discharged. For this purpose, it can be further advantageously and simply provided that the free outlet is associated with a trapping ring chamber of the housing, which has an outlet from the housing.

According to another advantageous variant, which is particularly easy to implement in terms of design, however, it is also possible to additionally provide for a further opening in the drum for discharging the further flowable phases from the drum in the form of a peeling disk. It can then be advantageously provided that the peeling disk has a discharge pipe formed coaxially with the feed pipe and guided coaxially with the latter out of the drum and through the opening in the first axial boundary wall of the housing.

In order to control the separation process, i.e., to be able to control or regulate it, it can also be provided that a regulating valve is connected downstream of the first peeling disk and/or the second peeling disk on the flow side—i.e., optionally on the discharge side—which can be controlled by a control device.

It may further be preferably provided that a disk pack is arranged in the drum as a separating means and that a peeling disk is arranged in the drum below the distributor and below the disk pack in a space-saving and simple manner, i.e., in an area that is otherwise often required for fastening a drive spindle, which is not required here. This peeling disk serves to discharge the first flowable phase from the drum.

It is preferred—since it is simple and safe in terms of design—that the rotor units for the magnetic bearing devices are arranged at the two axial ends of the drum and that the feed pipe and the discharge pipe of the first peeling disk each pass axially through one of these two rotor units.

It is particularly advantageous and practical that the separator insert is designed as a pre-assembled unit. In particular, it can also be provided that all elements of this insert that come into contact with the product are made of plastic or another non-magnetic material, wherein it can be replaced as a whole and can be completely disposed of after use. Cleaning and, optionally, steam sterilization of the separator insert are thus no longer necessary.

The respective bearing arrangement, which in addition to a radial bearing arrangement also provides an axial bearing arrangement for the drum and/or a rotary drive, can act permanently and/or electromagnetically.

At the outer circumference, the feed tube or a peeling disk shaft surrounding it is preferably inserted in the housing in a sealed manner or is formed integrally with it.

The drum can be of single-conical or double-conical design. It may additionally or alternatively also have one or more cylindrical sections. It may further be composed of several parts, in particular an upper part and a lower part, wherein these parts are preferably joined together (e.g., by gluing or welding) after the installation of internal components and their assembly. Similarly, the housing can be composed of several parts, in particular an upper part and a lower part, wherein these parts are preferably connected to each other (e.g., by gluing or welding) after the installation of internal components—in particular the rotor- and their assembly.

The outlets can have nozzles on the outside of the housing, which are sealed on the outer circumference of the housing, so that hoses or the like can be easily connected in this way. The hoses can also be pre-assembled on the nozzles so that they are completely and, if required, germ-free sealed. The nozzles can extend, for example, radially, tangentially, or obliquely to the radial direction.

After its manufacture, the entire separator insert can also be provided as a sealed unit into which no impurities can enter. For this purpose, the nozzles at the openings of the housing can be sealed and detachably closed. Thus, hose sections can be arranged on the nozzles, which have openable and closable connectors with which the separator insert can be connected to further elements of the feed and discharge system, such as bags or tanks or hose or pipe lines.

These separators are suitable for operation at variable, even relatively high speeds. In addition, it can also be used well for one-off processing—for example, for centrifugal separation of a product batch of a flowable fermentation broth as a suspension—from e.g., 100 L to several thousand, e.g., 4000 L-into different phases—and then disposed of. Here, a particular advantage is that all product-contacting components of the separator can be installed, operated, and subsequently disposed of as a prefabricated and already aseptic unit. This prefabricated unit consists at least of the rotor with the drum, the separating disks, the feed distributor and the rotor magnets or rotor units, as well as the housing with the inlets and outlets. Furthermore, the unit can also contain inlet and outlet lines (e.g., hoses) as well as measuring equipment or other components that come into contact with the product, which are intended for single use and are disposed of together with the separator unit after use.

Finally, it can be advantageously provided that the housing has only the openings for feed pipes and outlets and is otherwise hermetically sealed. For this purpose, it can be provided that the feed pipes and the outlets project outwardly from the housing in the manner of nozzles, wherein these nozzles are connected to the housing in a sealed manner or are formed integrally therewith.

BRIEF DESCRIPTION OF THE DRAWING FIGURES

Figure 2:
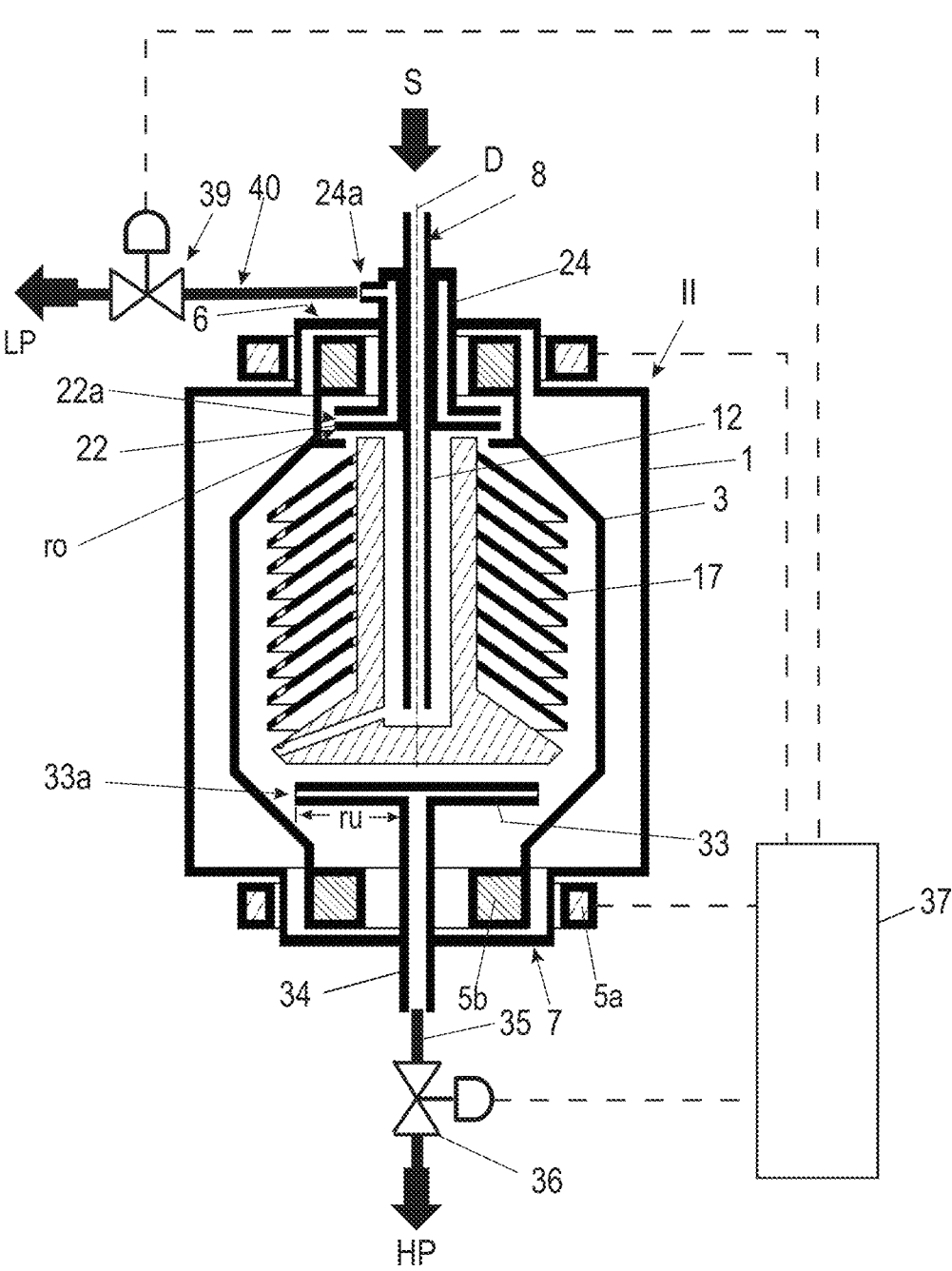
Figure 3:
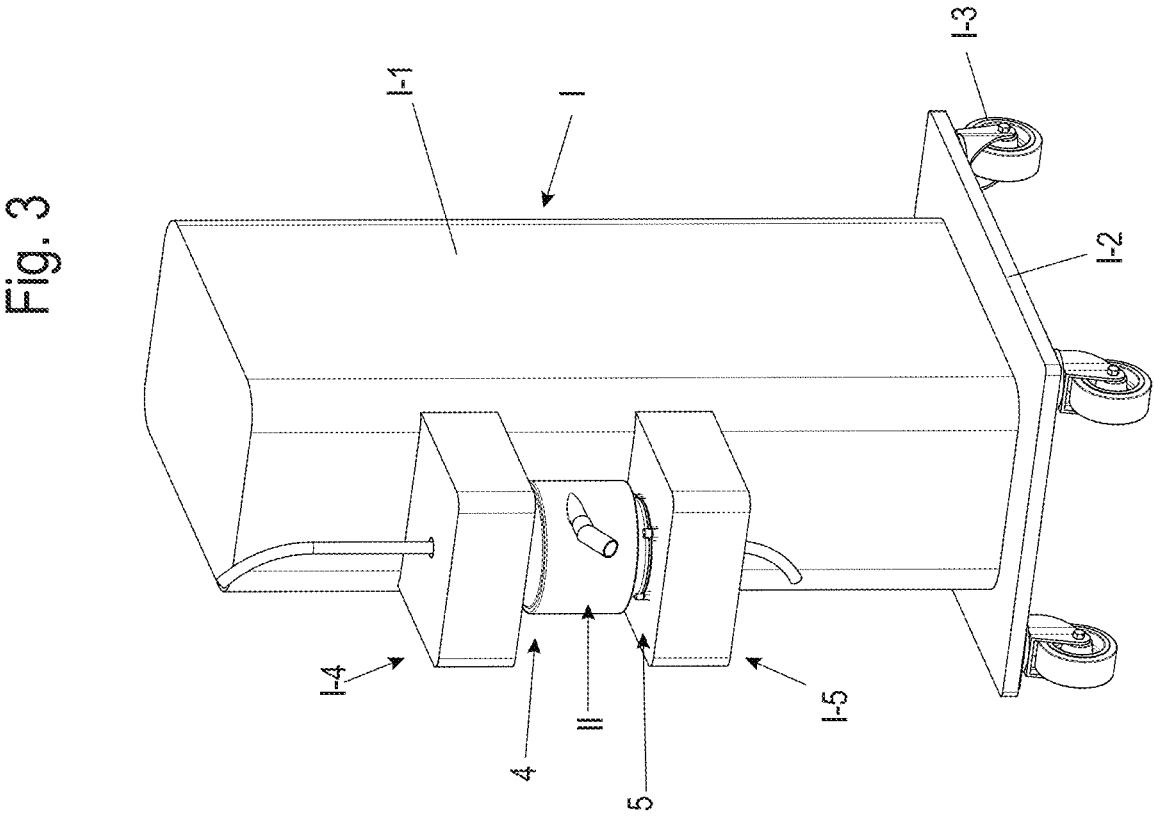
Figure 4:
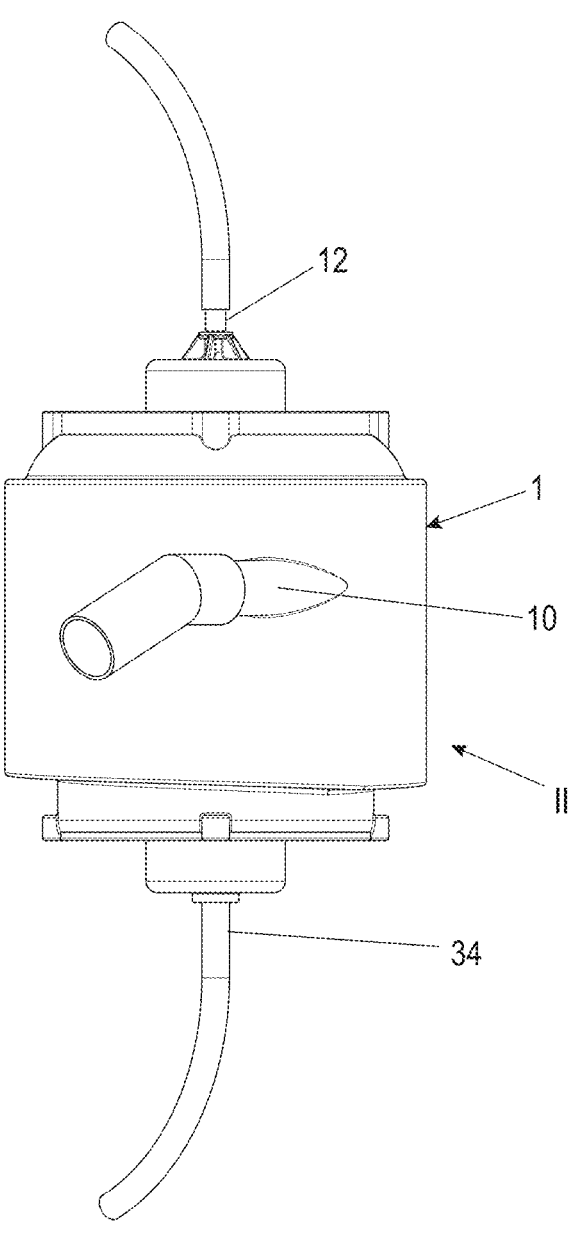
Figure 5:
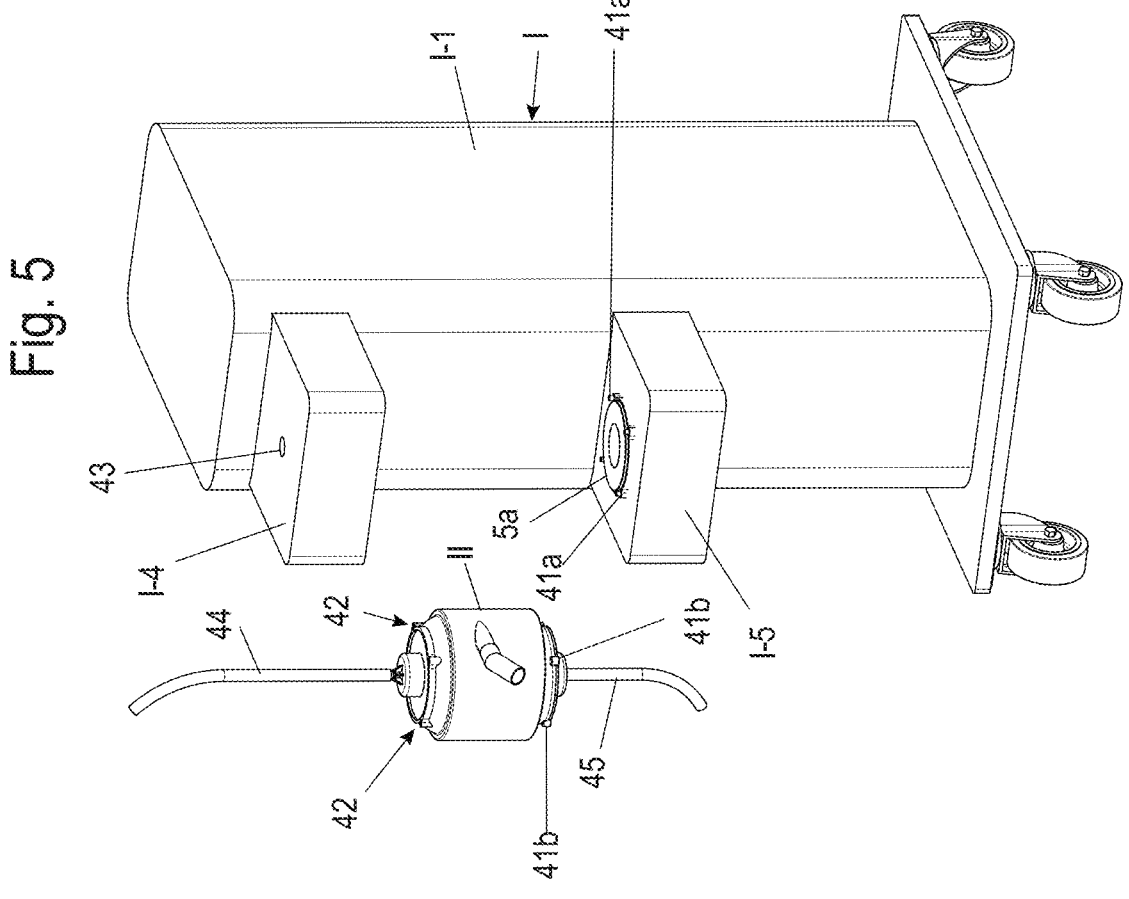
Figure 6:
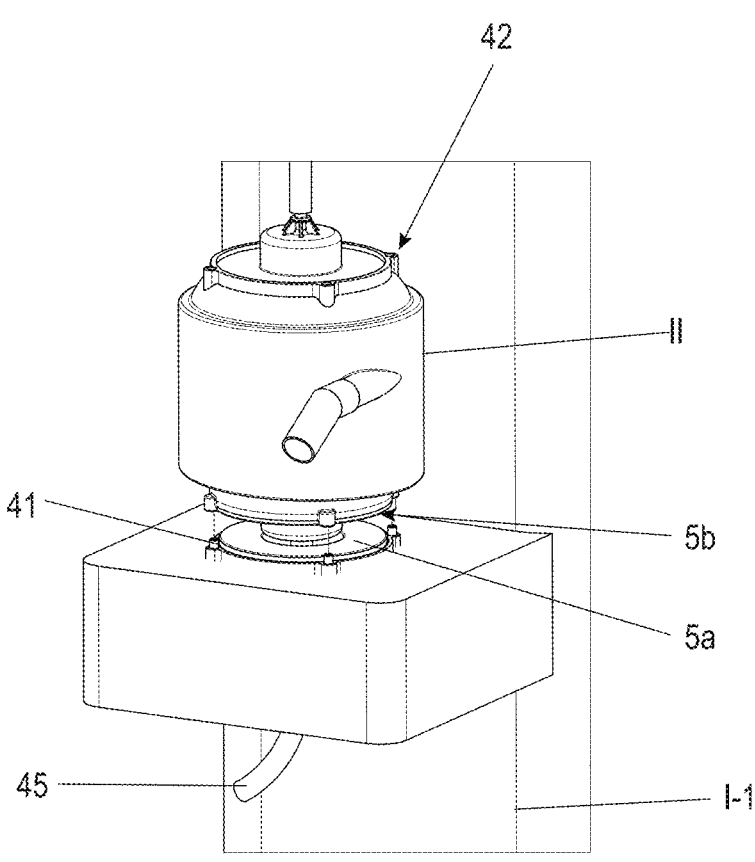
Figure 7:
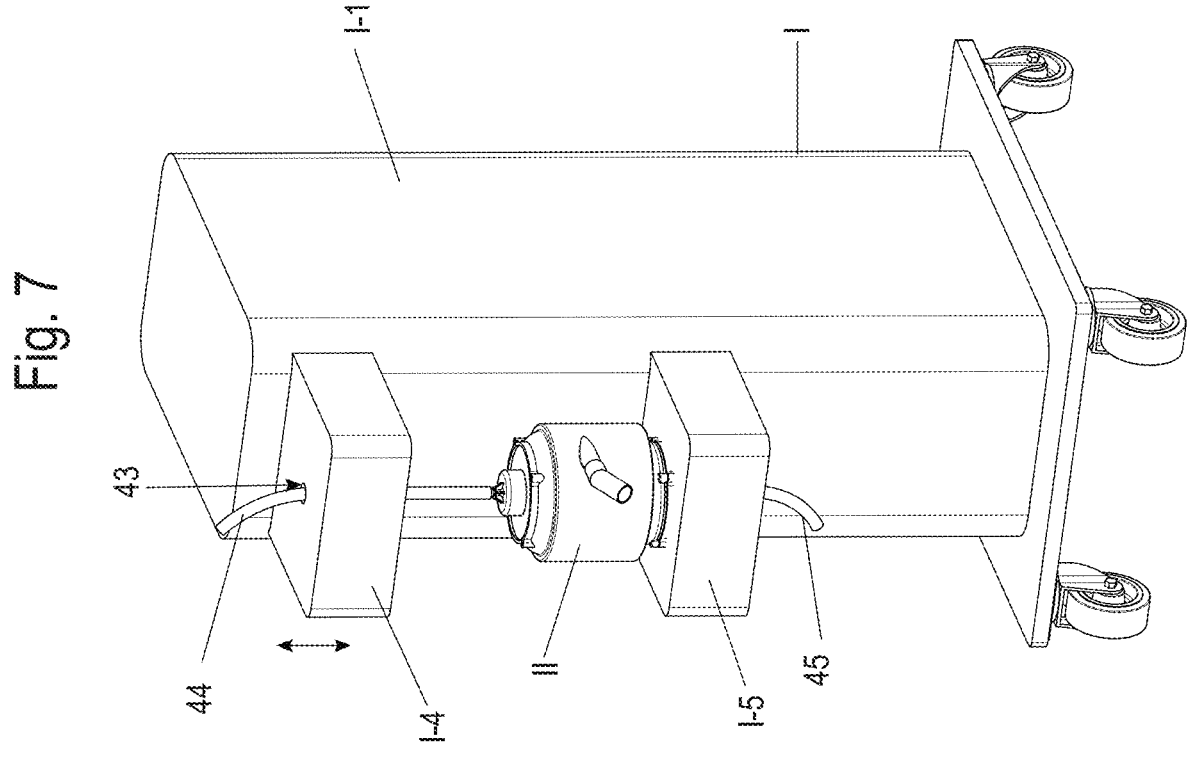
Figure 8:
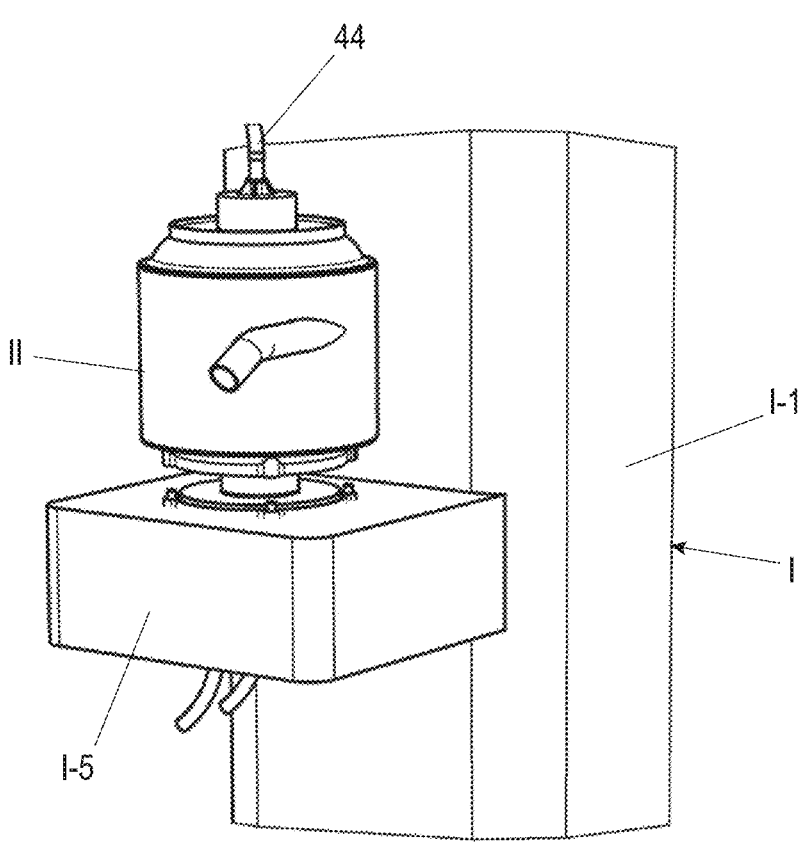

In the following, the invention is described in more detail by means of exemplary embodiments with reference to the drawing, wherein further advantageous variants and designs are also discussed. It should be emphasized that the exemplary embodiments discussed below are not intended to describe the invention conclusively, but that variants and equivalents not shown are also feasible and are covered by the claims, wherein:

FIG. 1: shows a schematic, sectional view of a first exchangeable separator insert of a separator together with a schematic view of a feed and discharge system and a control unit of the separator;

FIG. 2: shows a schematic, sectional view of a second exchangeable separator insert of a separator together with a schematic view of a feed and discharge system and a control unit of the separator;

FIG. 3: shows a schematic representation of a separator with a reusable frame and an exchangeable separator insert, the latter here in the manner of FIG. 1, with hose sections arranged thereon;

FIG. 4: shows a perspective view of the exchangeable separator insert of FIGS. 1 and 3 with hose sections arranged thereon;

FIGS. 5-7: show three successive steps in an insertion of the exchangeable separator insert of FIG. 4 into the frame of FIG. 3; and FIG. 8: shows a perspective view of a variation of the exchangeable separator insert

DETAILED DESCRIPTION

FIG. 3 shows a separator with a reusable frame I and with an exchangeable separator insert II of the type shown in FIG. 1 for centrifugal separation of a product-a suspension S-into different dense phases HP, LP. The separator insert could also be designed in the manner of FIG. 2.

The separator insert II is preferably designed as a prefabricated unit. In particular, the separator insert II is designed as a disposable separator insert that can be replaced or exchanged as a whole and is designed as a pre-assembled unit, which is made entirely or predominantly of plastic or plastic composite materials.

The separator insert (which does not include elements 4a and 5a) is shown separately as an example in FIGS. 1 and 2. It can be disposed of after processing of a product batch and exchanged for a new separator insert II.

According to FIGS. 1 and 2, the separator insert II of the separator has in each case a housing 1 and the rotor 2, which is inserted into the housing 1 and can be rotated relative to the housing 1 during operation. The rotor 2 has an axis of rotation D. This can be aligned vertically, which corresponds to the structure of the frame I. However, it can also be oriented differently in space if the frame is also designed accordingly.

The rotor 2 of the separator insert II has a rotatable drum 3. The rotor 2 is rotatably mounted at two locations axially spaced from one another in the direction of the axis of rotation by means of respective magnetic bearing devices 4, 5. Preferably, the rotor 2, and consequently also the drum 3, is then rotatably mounted at the two axial ends. The separator insert II has rotor units 4b, 5b of the magnetic bearing devices 4, 5. In contrast, stator units 4a, 5a of the magnetic bearing devices 4, 5 are arranged on the frame I-1.

The magnetic bearing devices 4, 5 preferably act radially and axially and hold the rotatably mounted rotor 2 in suspension in the housing 1 at a distance from the latter.

Such a separator with an easily exchangeable separator insert can be useful and advantageous for processing products for which it can be ruled out with a very high degree of certainty that impurities will be introduced into the product-a flowable suspension or its phases-during centrifugal processing, or for which cleaning and disinfection of the separator would be very costly or not possible at all.

The frame I has a console I-1. This can—but does not have to-be mounted on a carriage I-2 with rollers I-3.

Holders I-4 and I-5 can be formed on the console I-1, which serve to receive and hold the separator insert II also during operation. Preferably, a first axial end of the separator insert II projects from below into or up to the upper holder I-4 and a lower end of the separator insert II projects from above into or up to the other holder I-5, and in this case the separator insert II is non-rotatably held on the console I-1 and thus on the frame I.

One or both of the holders I-4 and/or I-5 can be arranged laterally on the frame I, in particular the console I-1. According to one variant, it can be further provided that, for example, the lower holder I-5 is formed stationary on the console I-1. It is then advantageous that the further upper holder I-4 is designed to be height-adjustable on the console I-1.

In this case, it is advantageous if the console I-1 has such a vertical extension/length that the separator insert is held stationary in a first position of the height-adjustable holder I-4 by both height-adjustable holders I-4, I-5 and can be changed in the other upper position.

It is advantageously provided in such a way that the holders I-4 and I-5 with the stator units 4a, 5a on the frame I can be moved axially apart and towards each other again in order to change the separator insert II, i.e., in order to be able to remove the old separator insert II from the frame I and replace it with a new one. This can be achieved, for example, with a rail on the console and a carriage that can be moved and locked in a sliding position on the height-adjustable holder (not shown in detail).

It is thus provided that the relative distance of the holders I-4 and I-5 with the stator units 4a, 4b of the bearing devices 4, 5 is adjustable in order to be able to change the separator insert II.

In the respective holders I-4 and I-5, respective stator units 4a, 5a of two drive and magnetic bearing devices 4 and 5 can be arranged. The control and power electronics for this can be arranged in or on the frame I, e.g., in, at or on the console I-1.

Corresponding interlocking elements can be formed on the holders I-4 and I-5 and on a housing 1 of the separator insert II, which does not rotate during operation, in order to be able to insert the separator insert II non-rotatably into the stator units 4a, 5a. The upper and lower stator units 4a, 5a can each have axes in alignment with one another.

According to a particularly simple variant, for this purpose the housing 1 and the holders I-4 or I-5 with the stator units 4a, 5a can have projections (e.g., pins or webs) and recesses (e.g., bores) as the corresponding interlocking elements in order to hold the housing 1 non-rotatably on the stator units and therefore on the frame II. The corresponding interlocking elements can also be formed directly on the frame II.

The position of these corresponding interlocking elements also defines the functionally required position of the stator units 4a, 5a and the rotor units 4b, 5b relative to each other. This relates, in particular, to the precise centering of the units 4a, 5a and 4b, 5b, which lie coaxially one inside the other. Optionally, a holding force (from above and below) can also be exerted on the housing in the axial direction by the holders in order to hold it frictionally, if necessary.

According to FIGS. 3 to 7, the above measures are implemented by way of example as follows.

The holders I-4 and I-5 with the stator units 4a, 5a of the frame I each have a plurality of pins 41a projecting in the axial direction, and the respective separator insert II can have corresponding blind holes on the housing 1 extending in the axial direction, for example, as recesses 42 or 41b.

Here, the holder I-4 with the stator unit 4a has pins 41 projecting axially or vertically downwards (not visible here) and the separator insert II has corresponding blind hole-like recesses 42 corresponding vertically at the top (visible here) and the lower holder I-5 with the lower stator unit 5a has corresponding pins 41a projecting axially or vertically upwards (visible here) and the separator insert II has corresponding blind hole-like recesses corresponding axially at the bottom (not visible here). Purely by way of example, four pins 41a and four recesses 41b are arranged on the corners of an imaginary polygon, in particular a square, and are formed at the top and bottom of the holders I-4, I-5 and the housing 1 of the separator insert II, respectively. In FIGS. 3-7, corresponding interlocking elements 41a, 41b and 42 are arranged circumferentially distributed around the separator insert II. However, it is also possible that only one interlocking element is provided instead of a plurality of interlocking elements.

However, the corresponding interlocking elements can also be arranged asymmetrically to ensure that the separator insert can only be used in a single orientation.

The stator units 4a, 5a can also each have openings, in particular passage openings 43, to accommodate lines such as hoses 44, 45 connected to the separator insert II at the top and/or bottom.

One or both holders I-4 and I-5 can be adjusted vertically. One of the two holders I-4 or I-5 can therefore also be fixed to the frame I. It is also conceivable that one of the two holders I-4 or I-5—e.g., the lower one—is formed on a wall of the frame I and is not adjustable. It is then sufficient to design the frame I in such a way that the respective other holders I-4 or I-5 are adjustable, in particular are arranged and/or designed on the frame I so as to be vertically adjustable.

This can be seen clearly from the interaction of FIGS. 3 to 7.

FIG. 5 shows the frame I before insertion of a separator insert II.

The two stator units 4a, 5a have been moved far enough apart relative to each other so that the respective separator insert can be lifted axially between the two holders with the stator units 4a, 5a (FIGS. 5, 6), with the separator insert II then being placed in/on the lower holder I-5 (FIGS. 6 and 7) in such a way that the corresponding interlocking elements—here 41, 42—engage into each other. In addition, the hose 45 at the lower end of the housing 1 has been guided downward through the passage opening 43 of the lower—and thus axially associated-stator unit 5a (FIG. 6). Now, the upper holder I-4 is lowered until also the corresponding interlocking elements of the upper holder I-4 and the housing 1 of the separator insert I-here 41,42—securely engage into each other (FIG. 7). At the same time, upper hoses 44 on the housing 1 are guided through the passage opening 43 of the upper holder I-4. Now the separator insert II is held securely against rotation on the frame I. Therefore, the centrifuging and separating process for processing a product batch in the centrifugal field can begin. After processing the intended batch, the upper separator unit is lifted up again until the separator unit can be lifted out of the frame I and exchanged for a new one.

In the following, with reference to FIG. 1 and FIG. 2, the further structure of exemplary preferred separator inserts II is described in more detail, together with the structure of the drive and bearing system of the separator, the control system of the separator and the feed and discharge system of the separator. The invention is not limited thereto. In particular, the feed and discharge systems can also be implemented differently on the separator insert II.

First, the rotor units 4b, 5b can be essentially of the type of inner rings made of magnets, in particular permanent magnets, and the reusable stator units 4a, 5a, can be essentially of the type of outer rings used to support the rotor 2 axially and radially (e.g., at the top) or, alternatively, to drive it in rotation (e.g., at the bottom).

Thus, the rotor units 4b and/or 5b, as part of the separator drive, also constitute part of the rotating system or rotor. In other words, the rotor of the drive is thus a part of the drum of the centrifugal separator.

One or both of the magnetic bearing devices 4, 5 is/are thus preferably also used in addition as a drive device for rotating the rotor 2 with the drum 3 in the housing 1. In this case, the respective magnetic bearing device forms a combined magnetic bearing and drive device. The magnetic bearing devices 4, 5 can be designed as axial and/or radial bearings, which support the drum 3 at its ends during operation in an overall cooperating axial and radial manner and hold it suspended and rotate it overall during operation.

The magnetic bearing devices 4 and 5 can have the same or largely the same basic design. In particular, only one of the two magnetic bearing devices 4, 5 can also be used as a drive device. Corresponding components of the magnetic bearings 4, 5 are thus formed on the separator insert II—on its rotor 2—and other corresponding parts are formed on the frame I. One or both stator units 4a, 5a can also be electrically connected to control and power electronics for driving the electromagnetic components of the magnetic bearing devices.

The respective magnetic bearing device 4, 5 can, for example, operate according to a combined electro- and permanent-magnetic principle.

Preferably, at least the lower axially acting magnetic bearing device 5 serves to keep the rotor 2 axially suspended within the housing 1 by levitation. It can have one or more first permanent magnets, for example on the underside of the rotor, and further have electromagnets on a holder on the frame which coaxially surround the permanent magnet or magnets. The drive of the rotor can be achieved electromagnetically. However, a drive via rotating permanent magnets can also be realized.

Such bearing and drive devices are used, for example, by the company Levitronix for driving centrifugal pumps (EP2 273 124 B1). They can also be used within the scope of this specification. For example, a first Levitronix motor "bottom" can be used as a drive, which at the same time magnetically supports the drum radially and axially. In addition, a second Levitronix motor—for example identical in construction except for the control in operation—can be provided, which as the magnetic bearing 4 can radially and axially support the rotor 2 at the head.

The rotor speed can be variably adjusted with the aid of a control device 37 (see FIG. 1 or 2) or a separate control device for the magnetic bearings 4, 5. Likewise, the direction of rotation of the rotor 2 can be specified and changed in this way.

During operation, the rotor 2 rotates, thus being held axially in suspension and radially centered. Preferably, the rotor 2 is operated with the drum 3 at a speed of between 1,000, preferably 5,000 to 10,000, and possibly also up to 20,000 revolutions per minute. The centrifugal forces generated as a result of the rotation lead to the separation of a suspension to be processed into different flowable phases LP, HP of different density, as already described above, and to their discharge, as described in more detail below. The product batch is processed in continuous operation, which means that the phases separated from the suspension are completely discharged from the drum again during operation.

This makes it very possible to create a separator insert and housing for a separator that can be designed for single use, which in turn is of particular interest and advantage for the processing of pharmaceutical products such as fermentation broths or the like, since after operation for processing a corresponding product batch in preferably continuous operation during the processing of the product batch, no cleaning of the drum needs to be carried out, since the entire separator insert can be replaced. Optionally, individual elements such as magnets can be suitably recycled (see also DE 10 2017 128 027 A1).

The housing 1 is preferably made of a plastic or plastic composite material. The housing 1 can be cylindrical and have a cylindrical outer jacket, at the ends of which two radially extending boundary walls 6, 7 (cover and base) are formed.

The drum 3 is used for centrifugal separation of a flowable suspension S in a centrifugal field into at least two phases LP, HP of different density, which may be, for example, a lighter liquid phase and a heavy solid phase or a heavy liquid phase.

In a preferred design, the rotor 2 and its drum 3 have a vertical axis of rotation D. However, the housing 1 and the rotor 2 could also be oriented differently in space. The following description refers to the vertical orientation shown (FIG. 3). In case of a different orientation in space, the alignments change according to the new orientation. In addition, one or both outlets-still to be discussed—may be arranged differently.

The rotor 2 of the separator with the drum 3 is preferably made entirely or predominantly of a plastic material or of a plastic composite material.

The drum 3 is preferably cylindrical and/or conical, at least in sections. The same applies to the other elements in the rotor 2 and on the housing 1 (except for elements of the magnetic bearing devices 4, 5).

The housing 1 is designed in the manner of a container, which is advantageously hermetically closed except for some openings/opening areas (still to be discussed).

According to FIGS. 1 and 2, one of the openings is formed in each of the two axial boundary walls 6, 7, which are located here exemplarily at the top and bottom, of the container 1.

According to FIGS. 1 and 2, one of the openings—in the first, here upper axial boundary wall 6—enables or serves as a feed 8 for feeding a suspension to be separated in the centrifugal field into at least two phases of different density-LP and HP-through the housing 1 into the drum 3.

Here, the first phase is a lighter phase LP and the second phase is a denser, heavier phase HP compared to the first phase.

A second of the openings—in the second, here lower, axial boundary wall 7—allows or serves as an outlet for the second heavier phase HP directly from the drum 3 through the housing 1.

The drum 3 also has openings associated with the openings of the housing.

A feed pipe 12 for a suspension to be processed extends into an upper opening 12a at one axial end of the drum 3. This passes through the housing 1, in particular its one-here upper-axial boundary wall 6. At the outer circumference, the feed pipe 12 is inserted into the housing 1 in a sealed manner according to FIG. 1—e.g., by welding or bonding—or, optionally, is designed integrally with the housing as a plastic injection-molded part. It is preferably also made of plastic. The feed pipe 12 protrudes outwardly from the housing 1 at the top with one end and extends through the upper boundary wall 6 into the drum 3, wherein it does not touch the drum 3.

According to FIG. 1 (but also FIG. 2), the feed pipe 12 passes concentrically to the axis of rotation of the rotor 2 through the housing 1 and the one magnetic bearing 4, then extends axially within the housing 1 further into the rotatable drum 3 and ends there with its other end-a free outlet end.

According to FIGS. 1 and 2, the feed pipe 12 opens in each case in the drum 3 in a distributor 13, which can rotate with the drum 3. The distributor 13 has a tubular distributor shaft 14 and a distributor foot 15. One or more distributor channels 16 are formed in the distributor foot 15. A separator disk stack consisting here of conical separator disks 17 can be placed on the distributor 13. The distributor 13 and the separator disks 17 are preferably also made of plastic.

In addition, according to both FIG. 1 and FIG. 2, a first peeling disk 33 serves to drain the heavier phase HP of the two phases HP and LP from the drum 3. A peeling disk shaft or a central drain pipe 34 passes through the second axial boundary wall 7 (see FIG. 1 and FIG. 2).

According to a possible—but not mandatory-design, the drum 3 here has at least two cylindrical sections 18, 19 of different diameter. Adjacent to these, one or more conical transition areas can be formed on the drum 3. The drum 3 can also be of single or double conical design overall in its central axial region on the inside (not shown here).

As shown, the drum 3 may have a lower cylindrical section 20 of smaller diameter, on/in which the rotor unit 5b of the lower magnetic bearing is also formed, which merges into a conical region 20a, then here for example a cylindrical section 19 of larger diameter, then again a conical region 18a and then an upper cylindrical section 18 of smaller diameter, on which the rotor unit 4b of the upper magnetic bearing 4 is formed.

With regard to the discharge of the lighter phase, the separator inserts of FIGS. 1 and 2 differ from each other.

According to FIG. 1, openings (which can be provided on the drum 3 in a circumferentially distributed manner, wherein several openings can thus be provided on the drum 3 in each case) serve as radial or tangential outlets 21 of the light phase LP from the drum 3. According to the exemplary embodiment of FIG. 1, an opening in the housing outer jacket then enables the outlet or serves as a drain 10 of the lighter product phase LP formed during the centrifugal separation, which has been discharged from the drum 3.

The first outlets 21 on the radius ro of the drum 3 are designed in particular as "nozzle-like" openings in the outer jacket of the drum 3. They are also designed as so-called "free" outlets from the drum 3. Here, the first outlets 21 serve to discharge the lighter phase LP. In this context, the outlets can be designed in such a way that the light phase emerges radially or, alternatively, they can be designed in such a way that the light phase emerges tangentially against the direction of rotation of the drum and thus contributes to driving the rotor and reducing the drive energy. This phase emerging from the drum 3 is caught in the housing 1 in an upper trapping ring chamber 23 of the housing 1. This trapping ring chamber 23 is configured such that the phase trapped therein is directed to the drain 10 of the trapping ring chamber 23. This can be achieved in such a way that the drain 10 is located at the lowest point of the trapping ring chamber 23. The trapping ring chamber 23 is open radially inwards towards the rotating drum 3 and is spaced in such a way that liquid spraying out of the respective outlet 21 is essentially only sprayed into the associated trapping ring chamber 23—which is at the same axial level—during centrifugal separation.

A chamber 25 not serving to discharge a phase can optionally be formed below the trapping ring chamber 23. This chamber 25 can optionally have a leakage drain (not shown here). The leakage can drain freely, preferably into a container. However, it can also be evacuated by negative pressure if the chamber 25 has a negative pressure connection for connecting a negative pressure generating device.

The first trapping ring chamber 23 and the chamber 25 may be separated from each other by a first wall 26, which is conical in this case and extends inwardly as well as upwardly from the outer jacket of the housing 1 and ends radially in front of the drum 3 at a distance therefrom.

Preferably at the lowest point of the trapping ring chamber, the product phase LP is discharged from the housing 1 through the drain 10. Nozzles can be provided on the outside of the housing 1 in the area of the drain 10 in order to be able to easily connect lines, hoses and the like.

These can in turn be formed directly with or adhesively attached to the housing 1. The nozzles are preferably also made of plastic. The housing 1 can be composed of several plastic parts, which are sealed together, for example, by adhesive bonding or welding.

According to FIGS. 1 and 2, the first peeling disk 33 is provided as the (here second) outlet for the heavier phase HP from the drum (through the housing 1), which extends essentially radially and merges into an axially extending drain pipe 34 as the peeling disk shaft, which passes through the lower axial boundary wall 7 of the housing 1. The peeling disk 33 has an outer diameter ru. Here, ru>ro applies. The inlet openings 33a of the peeling disk 33 thus lie on a larger diameter or radius ru than the outlets 21 for the light phase LP on the radius ro. This makes it possible to use the peeling disk 33 to discharge a heavier phase HP from the drum 3 relative to the lighter phase LP. The peeling disk 33 is stationary during operation of the separator and dips with its outer edge into the heavier phase HP rotating in the drum 3.

The phase HP is diverted inwards through the channels in the peeling disk 33. The peeling disk 33 thus serves to discharge the phase HP in the manner of a centripetal pump.

The peeling disk 33 can be arranged in a simple and compact manner in the drum 3 below the distributor 14 and below the disk pack 17. The radius ru corresponds to the immersion depth of the peeling disk 33.

The discharge pipe 34 is guided with one end out of the housing 1 downwards out of the drum and through the lower boundary wall 7, but does not touch the drum 3. The discharge pipe 34 can be formed integrally with the housing 1 or be inserted into it in a sealed manner. A hose or the like can be connected to the discharge pipe as a discharge line 35.

The discharge pipe passes through the housing 1 and the lower magnetic bearing 5 concentrically to the axis of rotation D of the rotor 2, then extends axially further within the housing 1 into the peeling disk 33.

It can be provided that a controllable, in particular electrically controllable, control valve 36 is inserted into the outlet for the heavy phase HP, in particular into the discharge line 35 for the heavier phase HP. By means of the regulating valve 36, the volumetric flow of the heavy phase HP in the discharge line 35 can be throttled and the immersion depth of the associated peeling disk can be increased. A control device 37 is preferably provided. The regulating valve 36 is preferably connected to the control device 37 in a wireless or wired manner.

The control device 37 may also be designed and provided for controlling the magnetic bearings 4, 5 and the drive.

According to FIG. 2, the light phase LP is also discharged via a peeling disk.

For this purpose, a peeling disk 22 is provided in the upper area of the drum 3 here, the inlet openings 22a of which can again be located at a smaller radius ro than the radius ru of the inlet of the first-lower-peeling disk 33 for the heavier phase.

The shaft of this peeling disk 22 can surround the feed pipe 8 in the manner of an annular channel like an outer drain pipe 24 and be tightly connected to the housing 1 instead of the feed pipe 8 or be formed integrally therewith. Thus, according to FIG. 2, the drain pipes 24, 34 of the two peeling disks 22, 33 are led out of the drum 3 at opposite ends thereof. They are further led out of the housing 1 at opposite ends thereof. They may be inserted in the housing 1 in a sealed manner. However, they may also be integrally made with the latter from plastic. The feed pipe 12 may be connected to the peeling disk shaft 24 at the upper end thereof. A radial or tangential connecting nozzle 24a may extend from the peeling disk shaft 24. A discharge line 40 for discharging the light phase can be connected to this, which can open into a bag or tank or the like, for example. Accordingly, the ends of the pipes 12 and 34 can also be designed as nozzles for connecting hoses or the like (FIG. 2, but also FIG. 1).

It may be provided that a controllable, in particular electrically controllable, regulating valve 39 is also inserted into the discharge line 40 for the light phase LP.

By means of the regulating valve 39, the volume flow of the light phase LP can be changed, in particular throttled more or less, and thus the immersion depth of the second peeling disk 22 can be changed. The regulating valve 39 is also connected to the control device 37 in a wireless or wired manner, so that it can be controlled by the control device 37.

The respective peeling disk 22, 33 is in each case a cylindrical and essentially radially aligned disk provided with a plurality of channels, for example with one to six, which is stationary in operation and has channels, so that a kind of centripetal pump is formed. The respective peeling disk 22 or 33 dips with its outer edge into the phase LP or HP rotating in the separator. Through the channels in the peeling disk, the respective phase LP, HP is diverted inwards and the rotational speed of the respective phase LP, HP is converted into pressure. The respective peeling disk 22, 33 thus replaces a drain pump for the respective phase LP, HP. The peeling disks thus each operate as a centripetal pump. They can be made of plastic.

Theoretically, a third peeling disk could also be provided, which could be used to derive a further phase.

In the following, the operation of the separators according to FIG. 1 and then according to FIG. 2 will be briefly described.

First, the respective separator with its reusable components is provided. These include the frame I and the drive and stator units 4a, 5a of the magnetic bearing devices. This also includes a control unit 37. A separator insert II is then provided and mounted on the frame I. For this purpose, only the stator units 4a and 5a have to be moved apart. The separator insert is then positively inserted and the stator units are moved towards each other. This holds the housing securely against rotation. Optionally, hoses are now connected to the nozzles, which open into tanks or bags. The respective separator insert of FIGS. 1 and 2 can therefore preferably at least also have hoses and connecting pieces which can be connected to further lines (not shown here) as well as containers such as bags, tanks, pumps and the like.

Then, after connecting the pipes and hoses and the like, a suspension is fed into the rotating drum (feed 8) and separated there centrifugally into the light phase LP and the heavy phase HP.

The heavier phase HP of greater density flows radially outward in the drum 3 in the separation chamber. There, the phase HP leaves the drum on a radius ru through the channels of the stationary peeling disk 33.

The lighter phase LP flows radially inward in the drum 3 in the separation chamber and rises upward through a channel 38 on a shaft of the distributor. There, the phase LP leaves the drum at a radius ro as shown in FIGS. 1 and 2.

The regulating valve(s) 36, 39 can be used to influence the separation process in a simple manner. This results in an optimization of the separation process.

The main application of the separator according to the invention is cell separations in the pharmaceutical industry. The performance range is intended for processing broths from fermenters in the range of 100 L-4000 L as well as for laboratory applications.

Other areas of industry in which separators are used would also be conceivable: Chemical, pharmaceutical, dairy technology, renewable raw materials, oil and gas, beverage technology, mineral oil, etc.

The separators shown enable the production of a separator insert in which preferably all components in contact with the product can be made of plastic or other non-magnetic materials, which can be disposed of after single use or fed into a recycling process. Cleaning after use is thus not necessary. The separator and its operation can thus be implemented cost-effectively.

FIG. 8 shows a variation of a separator insert II of FIGS. 1-7 in a second embodiment variant, wherein identical features are provided with analogous reference signs. The special feature of this second embodiment variant is that the interlocking elements such as, for example, the pins 41 on the holder I-5 and the corresponding interlocking elements provided on the frame I are only provided on one side between the frame I and the separator insert II, thereby also enabling axial and torsional locking of the separator insert II with respect to the frame I. Among other things, this reduces the complexity of the assembly.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE SIGNS

Frame I
Console I-1

Carriage I-2
Rollers I-3
Holders I-4, I-5
Separator insert II
Housing 1
Rotor 2
Drum 3
Magnetic bearing devices 4, 5
Stator units 4a, 5a
Rotor unit 4b, 5b
Radial boundary wall 6, 7
Feed 8
Drain 10
Feed pipe 12
Opening 12a
Distributor 13
Distributor shaft 14
Distributor foot 15
Distributor channel 16
Separation disk 17
Cylindrical sections 18, 19, 20
Conical sections 18a, 20a
Outlets 21
Peeling disk 22
Inlet openings 22a
Trapping ring chamber 23
Drain pipe 24
Connecting nozzle 24a
Chamber 25
Conical wall 26
Peeling disk 33
Inlet openings 33a
Drain pipe 34
Discharge line 35
Regulating valve 36
Control device 37
Channel 38
Regulating valve 39
Discharge line 40
Pins 41, 41a
Recesses 41b
Recesses 42
Passage opening 43
Hoses 44, 45
Axis of rotation D
Suspension S
Phases LP, HP
Radii ro, ru

The invention claimed is:

1. A separator, comprising:
a frame; and
a separator insert exchangeably arranged on the frame,
a) wherein the separator insert is configured to separate a flowable suspension into at least two flowable phases of different density in a centrifugal field and forms a pre-assembled, exchangeable unit configured for insertion into stator units on the frame of the separator, wherein the separator insert comprises:
  i. a housing that is stationary in operation and is a container that is closed except for one or more openings,
  ii. a rotor arranged inside the housing and rotatable about an axis of rotation, wherein the rotor has a drum with one or more openings,
  iii. separating means arranged in the drum,
  iv. at least two rotor units for magnetic bearing devices at two axially spaced locations of the rotor with the drum, wherein the at least two rotor units are configured to hold the rotor with the drum in suspension, to rotatably support the drum, and to rotate the drum within the housing during operation of the separator,
b) wherein the frame includes mutually spaced apart holders having the stator units of the magnetic bearing devices, wherein the housing of the separator insert is non-rotatably retained between the mutually spaced apart holders such that the rotor remains rotatable with the drum,
c) wherein a relative position of the mutually spaced apart holders is changeable such that the separator insert is exchangeable,
d) wherein the housing and at least one of the mutually spaced apart holders have corresponding interlocking elements in order to non-rotatably retain the housing on the at least one of the mutually spaced apart holders.

2. The separator of claim 1, wherein the housing and the mutually spaced apart holders have corresponding interlocking elements to non-rotatably retain the housing on the mutually spaced apart holders.

3. The separator of claim 1, wherein the housing and only the mutually spaced apart holders have corresponding interlocking elements for retaining the housing non-rotatably on a respective one of the mutually spaced apart holders.

4. The separator of claim 1, wherein the housing and the mutually spaced apart holders have corresponding pins and recesses as corresponding interlocking elements to retain the housing non-rotatably on the mutually spaced apart holders.

5. The separator of claim 1, wherein a relative distance between the mutually spaced apart holders is adjustable.

6. The separator of claim 1, wherein one of the mutually spaced apart holders is arranged adjustably on a console on the frame, and wherein another one of the mutually spaced apart holders is arranged in a stationary manner on the console.

7. The separator of claim 1, wherein the mutually spaced apart holders are adjustably arranged on a console on the frame.

8. The separator of claim 1, wherein one or both of the mutually spaced apart holders is/are displaceably arranged on a console on the frame.

9. The separator of claim 1, wherein one or more axially aligned hose(s) is/are guided on the separator insert through a passage opening of a respective one of the mutually spaced apart holders.

10. The separator of claim 1, wherein the frame comprises a control device.

11. A method for exchanging a first separator insert of a separator for a second separator insert, wherein the separator comprises a frame, wherein the first and second separator inserts are configured to separate a flowable suspension into at least two flowable phases of different density in a centrifugal field and forms a pre-assembled, exchangeable unit configured for insertion into stator units on the frame of the separator, wherein the first and second separator inserts each comprise i. a housing that is stationary in operation and is a container that is closed except for one or more openings, ii. a rotor arranged inside the housing and rotatable about an axis of rotation, wherein the rotor has a drum with one or more openings, iii. separating means arranged in the drum, iv. at least two rotor units for magnetic bearing devices at two axially spaced locations of the rotor with the drum, wherein the at least two rotor units are configured to hold the rotor with the drum in suspension, to rotatably support the drum, and to rotate the drum within the housing during operation of the separator, wherein the frame includes mutually spaced apart holders having the stator units of the magnetic bearing devices, wherein the housing of the separator insert is non-rotatably retained between the mutually spaced apart holders such that the rotor remains rotatable with the drum, wherein a relative position of the mutually spaced apart holders is changeable such that the first separator insert is exchangeable for the second separator insert, and wherein the housing and at least one of the mutually spaced apart holders have corresponding interlocking elements in order to non-rotatably retain the housing on the at least one of the mutually spaced apart holders, the method comprising:

a) providing the separator with the first separator insert mounted on the frame of the separator;

b) changing a relative position of the mutually spaced apart holders, releasing an interlock between the frame and the first separator insert, and removing the first separator insert from the mutually spaced apart holders;

c) providing the second separator insert;

d) inserting the second separator insert into the one of the mutually spaced apart holders so that corresponding interlocking elements at one end of the housing and at one of the mutually spaced apart holders engage with each other; and e) changing the relative position of the mutually spaced apart holders until the corresponding interlocking element of the housing non-rotatably engages into the corresponding interlocking element of the at least a respective one of the mutually spaced apart holders.

12. The method of claim 11, wherein, when the first separator insert or the second separator insert is inserted into the frame, one or more axially outgoing hoses on the first or second separator insert are guided through a passage opening of a respective one of the mutually spaced apart holders.

13. The method of claim 11, further comprising:

connecting a leakage line to a leakage outlet of the second separator insert.

* * * * *